(12) United States Patent
Wang

(10) Patent No.: US 9,866,631 B2
(45) Date of Patent: Jan. 9, 2018

(54) SYSTEM AND METHOD FOR SHARING INFORMATION AMONG MULTIPLE DEVICES

(71) Applicant: TCL RESEARCH AMERICA INC., San Jose, CA (US)

(72) Inventor: Haohong Wang, San Jose, CA (US)

(73) Assignee: TCL RESEARCH AMERICA INC., San Jose, CA (US)

(*) Notice: Subject to any disclaimer, the term of this patent is extended or adjusted under 35 U.S.C. 154(b) by 259 days.

(21) Appl. No.: 14/585,296

(22) Filed: Dec. 30, 2014

(65) Prior Publication Data
US 2016/0191619 A1 Jun. 30, 2016

(51) Int. Cl.
| | | |
|---|---|---|
| *H04L 29/08* | (2006.01) | |
| *H04L 12/28* | (2006.01) | |
| *H04L 29/06* | (2006.01) | |
| *H04N 21/00* | (2011.01) | |

(52) U.S. Cl.
CPC .......... *H04L 67/1095* (2013.01); *H04L 12/28* (2013.01); *H04L 65/4084* (2013.01); *H04L 67/12* (2013.01); *H04N 21/00* (2013.01)

(58) Field of Classification Search
CPC ..... H04L 67/12; H04L 67/1095; H04L 12/28; H04L 65/4084; H04L 2111/00
USPC ................................................ 709/203, 248
See application file for complete search history.

(56) References Cited

U.S. PATENT DOCUMENTS

| | | | | |
|---|---|---|---|---|
| 7,444,388 B1* | 10/2008 | Svendsen | ................ | G06F 15/16 707/999.2 |
| 2007/0186235 A1* | 8/2007 | Jarman | .................. | H04N 7/163 725/28 |
| 2008/0059400 A1* | 3/2008 | Fernandez | ........ | G06F 17/30017 |
| 2009/0324026 A1* | 12/2009 | Kletter | ............... | G06K 9/00442 382/124 |
| 2010/0299313 A1* | 11/2010 | Orsini | ..................... | H04L 9/085 707/652 |
| 2011/0160882 A1* | 6/2011 | Gupta | ................ | H04N 21/4131 700/94 |
| 2012/0134282 A1* | 5/2012 | Tirronen | ............... | H04W 4/005 370/252 |
| 2012/0246343 A1* | 9/2012 | Story, Jr. | ............. | H04L 67/1095 709/248 |

(Continued)

FOREIGN PATENT DOCUMENTS

CN 103532803 A * 1/2014

*Primary Examiner* — Brian J Gillis
*Assistant Examiner* — Steve Lin
(74) *Attorney, Agent, or Firm* — Anova Law Group, PLLC

(57) ABSTRACT

A method for sharing information among multiple devices is provided. The method includes a sensing device sensing signals of at least one object associated with a targeting device and extracting at least one feature of the object from the sensed signals. The method also includes the sensing device broadcasting the extracted feature of the object on a determined network containing a plurality of targeting devices and receiving feedbacks from the plurality of targeting devices on the network in response to the broadcasting. Further, the method includes the sensing device automatically identifying one of the plurality of targeting devices based on the received feedbacks, synchronizing information with the identified targeting device and displaying the information to a user of the sensing device.

14 Claims, 6 Drawing Sheets

(56) References Cited

U.S. PATENT DOCUMENTS

| | | | |
|---|---|---|---|
| 2013/0054582 A1* | 2/2013 | Macklem | G06F 17/30864 707/723 |
| 2016/0092584 A1* | 3/2016 | Nigam | G06F 17/30958 707/741 |
| 2016/0092854 A1* | 3/2016 | Wu | G06Q 20/123 705/26.81 |

* cited by examiner

SYSTEM AND METHOD FOR SHARING INFORMATION AMONG MULTIPLE DEVICES

FIELD OF THE INVENTION

The present invention generally relates to the field of computer technologies and, more particularly, to systems and methods for sharing information among multiple devices.

BACKGROUND

As technology penetrates further into all aspects of people's daily life, many devices are connected devices in typical homes. The connected devices may include TVs, smartphones, tablets, set-top boxes, gaming consoles, and so on. With the rapid growth of Internet of Things (IoT) technology deployment, more household appliances, such as refrigerators, air conditioners, become connected. When a user intends to connect one device to another device, a typical way is to use a mobile device (such as a mobile phone) or a Personal Computer (PC) as a controller to manually setup a connection, in which sometimes the process can be quite tedious. The disclosed systems and methods are directed to solve one or more problems set forth above and other problems.

BRIEF SUMMARY OF THE DISCLOSURE

One aspect of the present disclosure includes a method for sharing information among multiple devices. The method includes a sensing device sensing signals of at least one object associated with a targeting device and extracting at least one feature of the object from the sensed signals. The method also includes the sensing device broadcasting the extracted feature of the object on a determined network containing a plurality of targeting devices and receiving feedbacks from the plurality of targeting devices on the network in response to the broadcasting. Further, the method includes the sensing device automatically identifying one of the plurality of targeting devices based on the received feedbacks, synchronizing information with the identified targeting device and displaying the information to a user of the sensing device.

Another aspect of the present disclosure includes a system for sharing information among multiple devices. The system includes a sensing device configured to seek information from other devices and at least one targeting device configured to share information to the sensing device. The sensing device includes a sensing and filtering module configured to detect signals of at least one object associated with a targeting device and filter out noises and unwanted content from the detected signals to generate a corresponding plurality of sensed signals and a signal abstraction module configured to extract at least one feature of the object from the sensed signals. The sensing device also includes a broadcast engine configured to broadcast the extracted feature of the object on a determined network containing a plurality of targeting devices and a response receiver configured to receive feedbacks from the plurality of targeting devices on the network in response to the broadcasting. Further, the sensing device includes a device recognizer configured to automatically identify one of the plurality of targeting devices based on the received feedbacks and an information synchronizer configured to synchronize information with the identified targeting device. The at least one targeting device includes a signal receiver configured to receive signals and handle the signal processing for rendering contents and other functions and a signal abstraction module configured to extract features from the received signals. The at least one targeting device also includes a data storage module configured to store the extracted features and a broadcast receiver configured to receive the features broadcasted from the sensing device. Further, the at least one targeting device includes a match engine configured to match the received features with the extracted features previously stored in the data storage module.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
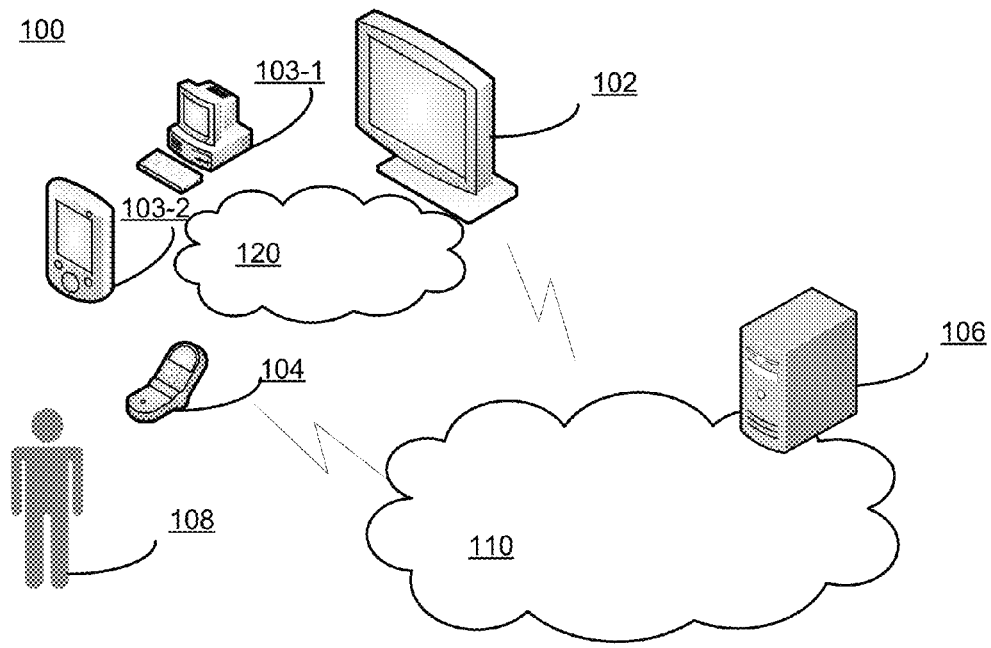
FIG. 1 illustrates an exemplary environment incorporating certain embodiments of the present invention.

FIG. 1 illustrates an exemplary environment 100 incorporating certain embodiments of the present invention. As shown in FIG. 1, environment 100 may include a television set (TV) 102, a personal computer (PC) 103-1, a multimedia player 103-2, a mobile phone 104, a server 106, a user 108, a network 110, and a local network 120. Other devices may also be included.

TV 102 may include any appropriate type of TV, such as a plasma TV, a liquid crystal display (LCD) TV, a projection TV, a non-smart TV, or a smart TV. TV 102 may be any appropriate content-presentation device capable of presenting multiple programs in one or more channels. PC 103-1 may include any computing system, such as a tablet, a desktop computer, a mobile computer, etc. Multimedia player 103-2 may include any appropriate type of multimedia player, such as an iPod, a MP3 player, or a wireless photo frame. It should be noted that more devices (not shown in FIG. 1), such as refrigerators, air conditioners, may be connected via local network 120 and/or network 110 in environment 100.

The mobile phone 104 may include any appropriate type of communication device that can communicate with TV 102, PC 103-1 and multimedia player 103-2 via local network 120, such as a tablet computer, a smart phone, a universal remote control, or any other computing device capable of performing remote control functions.

The TV 102, the PC 103-1, the multimedia player 103-2, and the mobile phone 104 are just exemplary devices used in a multi-device environment. Any appropriate devices having computing and communication capabilities may be used. The various devices, including the TV 102, the PC 103-1, the multimedia player 103-2, and the mobile phone 104 may be connected through the local network 120, which may be further connected to the network 110 as a part of an internet-of-things architecture.

Further, the server 106 may include any appropriate type of server computer or a plurality of server computers for providing information (e.g., video contents, audio contents) to the user 108. The server 106 may also facilitate communication, data storage, and data processing between mobile phone 104 and TV 102, PC 103-1, and multimedia player 103-2. Mobile phone 104, server 106, TV 102, PC 103-1 and multimedia player 103-2 may communicate with each other through one or more local network 120 and communication network 110, such as a cable network, a phone network, and/or a satellite network, etc.

The user 108 may interact with TV 102, PC 103-1 and multimedia player 103-2 using mobile phone 104 to watch various programs, listen to the music and perform other activities of interest. The user 108 may be a single user or a plurality of users, such as family members watching TV programs (or listening to the music) together.

Figure 2:
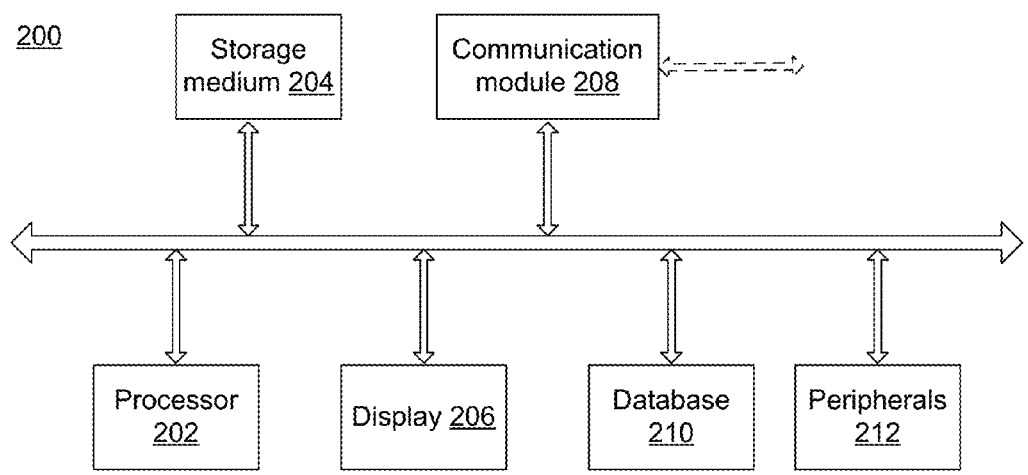
FIG. 2 illustrates an exemplary computing system consistent with the disclosed embodiments.

TV 102, PC 103-1, multimedia player 103-2, mobile phone 104, and/or server 106 may be implemented on any appropriate computing circuitry platform. FIG. 2 shows a block diagram of an exemplary computing system 200 capable of implementing TV 102, PC 103-1, multimedia player 103-2, mobile phone 104, and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes when the computer programs are executed by processor 202.

Further, peripherals 212 may include various sensors and other I/O devices, such as keyboard and mouse, and communication module 208 may include certain network interface devices for establishing connections through communication networks. Various devices may include various peripherals 212. For example, TV 102 may include video and voice processing modules, the mobile phone 104 may include cameras, microphones, and other sensors, the multimedia player 103-2 may include audio codec modules, etc. Further, the database 210 may include one or more databases for storing certain data and for performing certain operations on the stored data, such as database searching.

Returning to FIG. 1, the various devices (e.g., the mobile phone 104, the server 106, TV 102, and/or PC 103-1) may have two types of functions: (1) a signal provider, such as a TV, a radio, a mobile phone, and so on, which renders visual content on display, audio/music content or other signals into air or into a network; and (2) a signal receiver, such as a mobile phone, a camera and so on, which acquires certain types of signals.

An automatic process may be implemented to connect and synchronize two devices for information sharing in a user-friendly manner. That is, two devices with one or more of the above two types of functions may be connected and/or synchronized intelligently for information sharing. For example, when a user is at home and point the mobile phone's camera to the TV, the content information that is currently on the TV (for example, the program title, introduction and other information that can be provided by the smart TV) can be synchronized to the mobile phone, or when the user points the mobile phone's camera to a smart refrigerator, the refrigerator's food storage information can be synchronized to the mobile phone. Such simple and automatic connecting and information syncing may substantially improve user experience.

Figure 3:
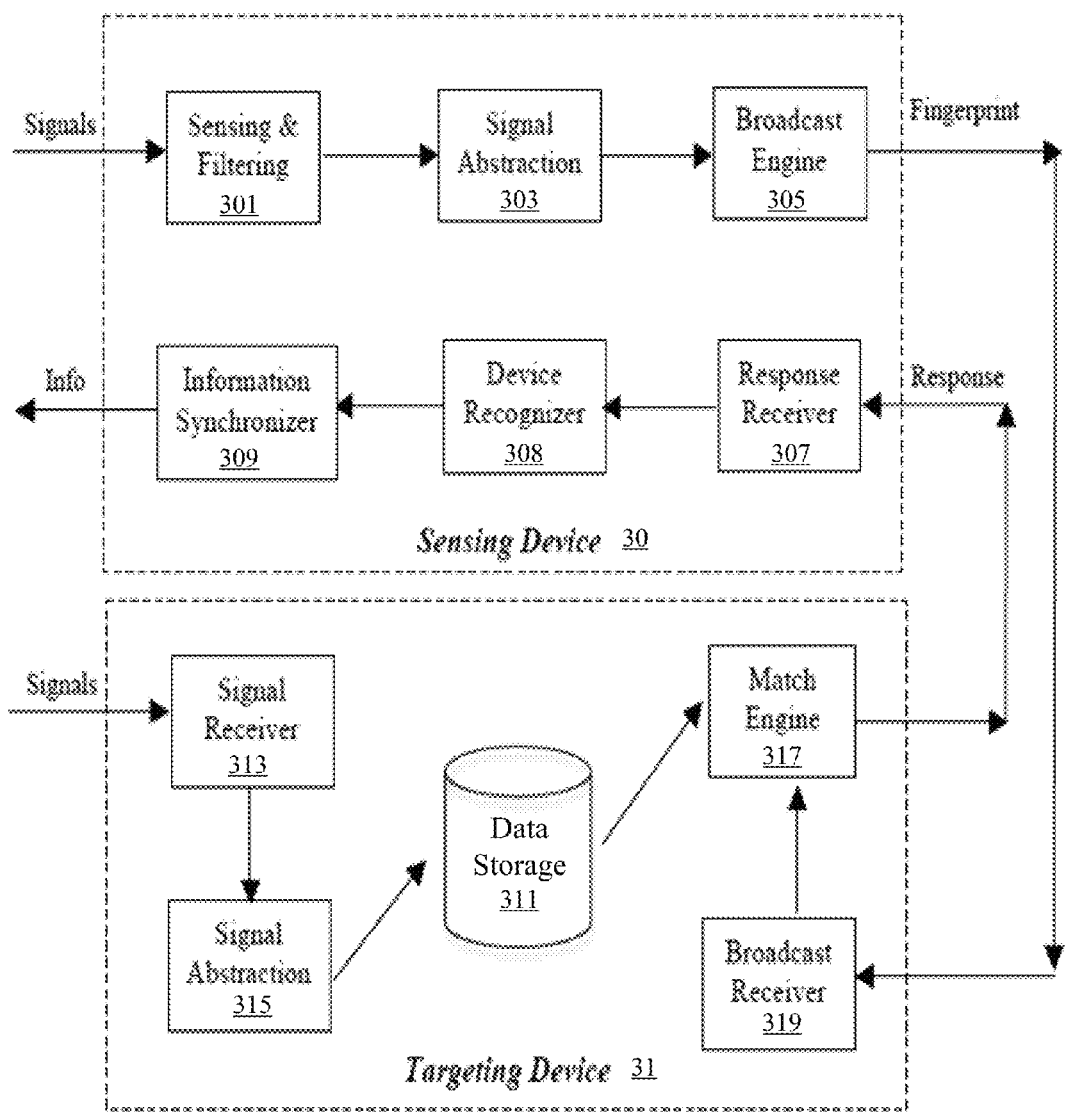
FIG. 3 illustrates a block diagram of an exemplary information system for sharing information among multiple devices consistent with the disclosed embodiments.

Thus, in operation, the mobile phone 104, the server 106, TV 102, and/or PC 103-1 may perform an automatic process to connect and synchronize two or more devices for sharing information. FIG. 3 illustrates a block diagram of an exemplary information system for sharing information among multiple devices consistent with the disclosed embodiments.

As shown in FIG. 3, the system 300 may include a sensing device 30 and at least one targeting device 31. The sensing device 30 may be configured to seek information from other devices, and the targeting device may be configured to share the information to the sensing device.

Specifically, the sensing device 30 has sensing capabilities, such as image acquisition, sound acquisition, or other signal sensing and acquisition. For example, the sensing device 30 may take photos and videos, record sounds, capture images, read sensor data, or generally acquire various signals, such as electrical signals, optical signals, sound signals, magnetic signals, radio signals, ultrasonic signals, etc.

The sensing device 30 also has a signal abstraction capability. That is, the sensing device 30 can be configured to transform the acquired signal to a much smaller sized signal format for transmission. In other words, the sensing device 30 can extract one or more features from the acquired signal. The feature, as used herein, may refer to a characteristic aspect or a representation of the acquired signal, which may also be called a fingerprint. With this capability, the sensing device 30 can sense the signals on the network or other environment.

Then, the sensing device 30 can broadcast the feature or the fingerprint to all the connected devices. For example, the sensing device 30 may broadcast the feature on the network it is connected to or broadcast the feature on the same network as well as different networks within a predetermined network scope.

On the other hand, the targeting device 31 also has signal abstraction capability. That is, the targeting device 31 can be configured to generate features or fingerprints of signals on the targeting device 21.

Further, the targeting device 31 also has a storage capability. That is, the targeting device 31 can record a number of features generated on the targeting device 31 for further processing.

The targeting device 31 also has a matching capability to match features broadcasted by the sensing device 30 with the stored feature, so that the targeting device 31 can identify whether the features received from the sensing device can be matched with locally stored features. It should be noted that the sensing device's features' original signals (i.e., before signal abstraction) can be a transformed and partial overlapped version of the targeting device's features' original signals. For example, a sensing device's features are generated from a photo of a TV screen with 30 degree rotation and including surrounding accessories of the TV, while a targeting device's features are generated from a screenshot of the TV.

Further, the targeting device 31 may send feedback to the broadcasting with the results of the matching, and the sensing device 30 has identification capability for determining which targeting device when the sensing device 30 is receiving feedback for the broadcasted features. In other words, the sensing device 30 recognizes the targeting device.

Further, both sensing device 30 and targeting device 31 have an information sharing and/or synchronization capability. For example, the targeting device 31 has information sharing capability for constantly transmitting the related information of current status (or program) to other devices or networks. While the sensing device has information receiving and updating capability for receiving information from the recognized targeting device and updating the information in real time. In other words, the sensing device 30 and the targeting device 31 can be synchronized.

More specifically, as shown in FIG. 3, the sensing device 30 may include a sensing and filtering module 301, a signal abstraction module 303, a broadcast engine 305, a response receiver 307, a device recognizer 308, and an information synchronizer 309. Certain components may be omitted and other components may be added. The sensing device 30 (e.g., the various components) may be implemented in hardware (e.g., computing system 200), software, or a combination of hardware and software.

The sensing and filtering module 301 may be configured to detect the surrounding signals (e.g., video signals, audio signals, optical signals) and filter out any noise or unwanted content from the detected signals to generate sensed signals, such as a whole or part of an image or an audio segment.

The signal abstraction module 303 may be configured to extract features from the sensed signals. The signal abstraction module 303 may generate a reasonable range based on the extracted features associated with the targeting device's signals and scale the features into a reasonable range to distinguish different signals. For example, the signal abstraction module 303 can transform the acquired signal to a much smaller sized signal format (called fingerprint) to save bandwidth for future collaborative computing among multiple devices.

The broadcast engine 305 is configured to broadcast the features to the targeting devices in the same network group for recognition. The response receiver 307 is configured to collect the targeting devices' responses of matching results for recognizing one desired targeting device. The device recognizer 308 is configured to compare matching feedbacks from the targeting devices and determine one desired targeting device. The information synchronizer 309 is configured to synchronize the sensing device with the recognized targeting device for sharing information.

The targeting device 31 may include a data storage module 311, a signal receiver 313, a signal abstraction module 315, a match engine 317, and a broadcast receiver 319. Certain components may be omitted and other components may be added. The targeting device (e.g., the various components) may be implemented in hardware, software, or a combination of hardware and software.

The signal receiver 313 is configured to receive signals and handle the signal processing for rendering contents or other functions. The signal abstraction module 315 is identical to the signal abstraction module 303 in the sensing device. That is, the signal abstraction module 315 is configured to extract features for the received signals using a same algorithm as that of the abstraction module 303 in the sensing device. The extracted features may be stored for the later use in the data storage module 311.

The match engine 317 is configured to match the received features with a plurality of features stored in the data storage module 311 to generate a matching score to represent the possibility of the received features as a copy of the features associated with the targeting device's signals. The broadcast receiver 319 is configured to receive the features broadcasted from the sensing device.

Figure 4:
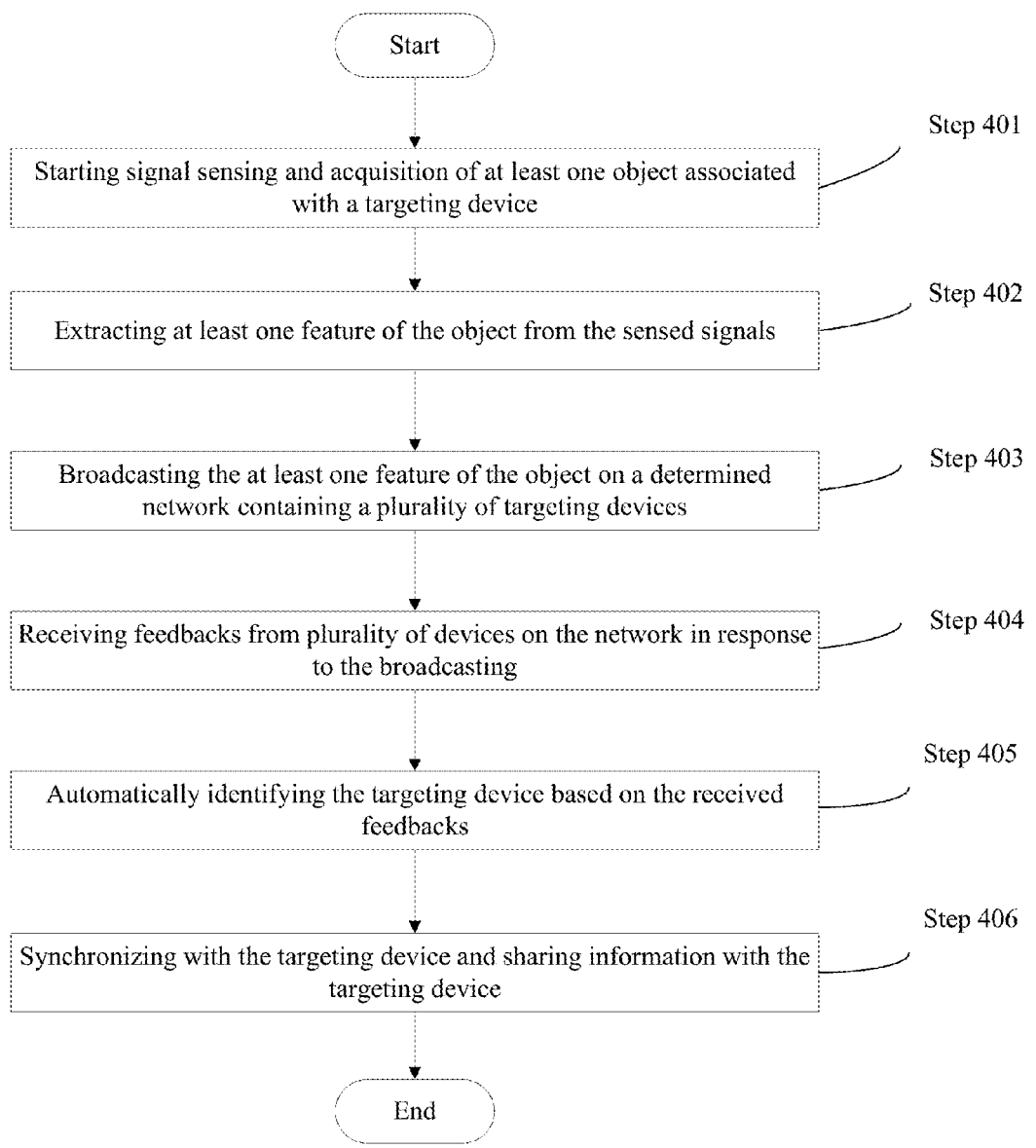
FIG. 4 shows an exemplary process for sharing information among multiple devices performed by a sensing device consistent with the disclosed embodiments.

FIG. 4 shows an exemplary process for sharing information among multiple devices performed by a sensing device consistent with the disclosed embodiments. As shown in FIG. 4, from a sensing device side, the process for sharing information among multiple devices may include the following steps.

At the beginning, the sensing device starts signal sensing and acquisition of at least one object associated with a targeting device (Step 401). Specifically, the sensing device senses or detects one or more surrounding signals (e.g., video signals, audio signals) from a network group. Noises may be filtered out from the detected signals by applying a de-noise filter.

Then, the sensing device extracts at least one feature of the object from the sensed signals (Step 402). For example, the sensing device may generate a fingerprint for the filtered signals to save bandwidth for future collaborative computing among multiple devices. The fingerprint refers to a representation of the sensed signal in a substantially smaller sized signal format associated with the sensed signals.

Further, the sensing device broadcasts the at least one feature of the object on a determined network containing a plurality of targeting devices (Step 403). That is, the sensing device broadcasts the at least one feature to all connected devices on the same network group for recognition. For example, the sensing device may broadcast the fingerprint to all connected devices in the same network group via a broadcast channel. The type of the feature/fingerprint, the size information, the algorithm associated with the feature, and/or the identification and address of the sensing device may also be included in the broadcasting message.

The sensing device receives feedbacks from a plurality of devices on the network in response to the broadcasting (Step 404). Thus, the sensing device can receive the targeting devices' responses of matching results for recognizing one desired targeting device. In certain embodiments, the feedback from a targeting device may be a matching score indicating a likeliness of the matching between the broadcasted fingerprint and locally stored fingerprints.

Based on the received feedbacks, the sensing device automatically identifies the targeting device (Step 405). Specifically, after receiving all responses (within a given waiting time constraint), the sensing device determines one desired targeting device via a recognizing algorithm.

A simple recognition algorithm is to select the device with a maximum matching score. However, if two matching scores have small difference, it may not be correct to just pick the higher one. Another factor is the history of the past matching (i.e., frequency information). If a device has been selected as the targeting device frequently, the chance that the device is selected this time is also high. For example, if a user watches soap TV shows every other day and the TV is selected as the targeting device frequently, the chance that the TV is selected this time is also high. From this point of view, these 2 factors are combined in a combined form to evaluate the outcome of device recognition.

That is, the outcome of the device recognition can be defined by:

$$H=a*S+(1-a)*f \quad (1)$$

where H is a final score; a is a real number between [0, 1] that is set by a user; S is a matching score received from a device; and f is the frequency of the device being selected in the past 10 times device recognition efforts for the same device.

Thus, based on the matching score and/or the final score, the sensing device may be able to identify or recognize the targeting device having the matching feature. After the recognition of the targeting device, the sensing device further synchronizes with the targeting device and shares information with the targeting device (Step 406).

For example, the targeting device may send relevant information about the broadcasted feature to the sensing device, or the sensing device may further inquire the targeting device for certain information and the targeting device may respond with relevant information. In other words, the sensing device and the targeting device may synchronize and exchange certain information based on the feature. Thus, the sensing device may deliver the sharing information of the recognized targeting device to the user.

Figure 5:
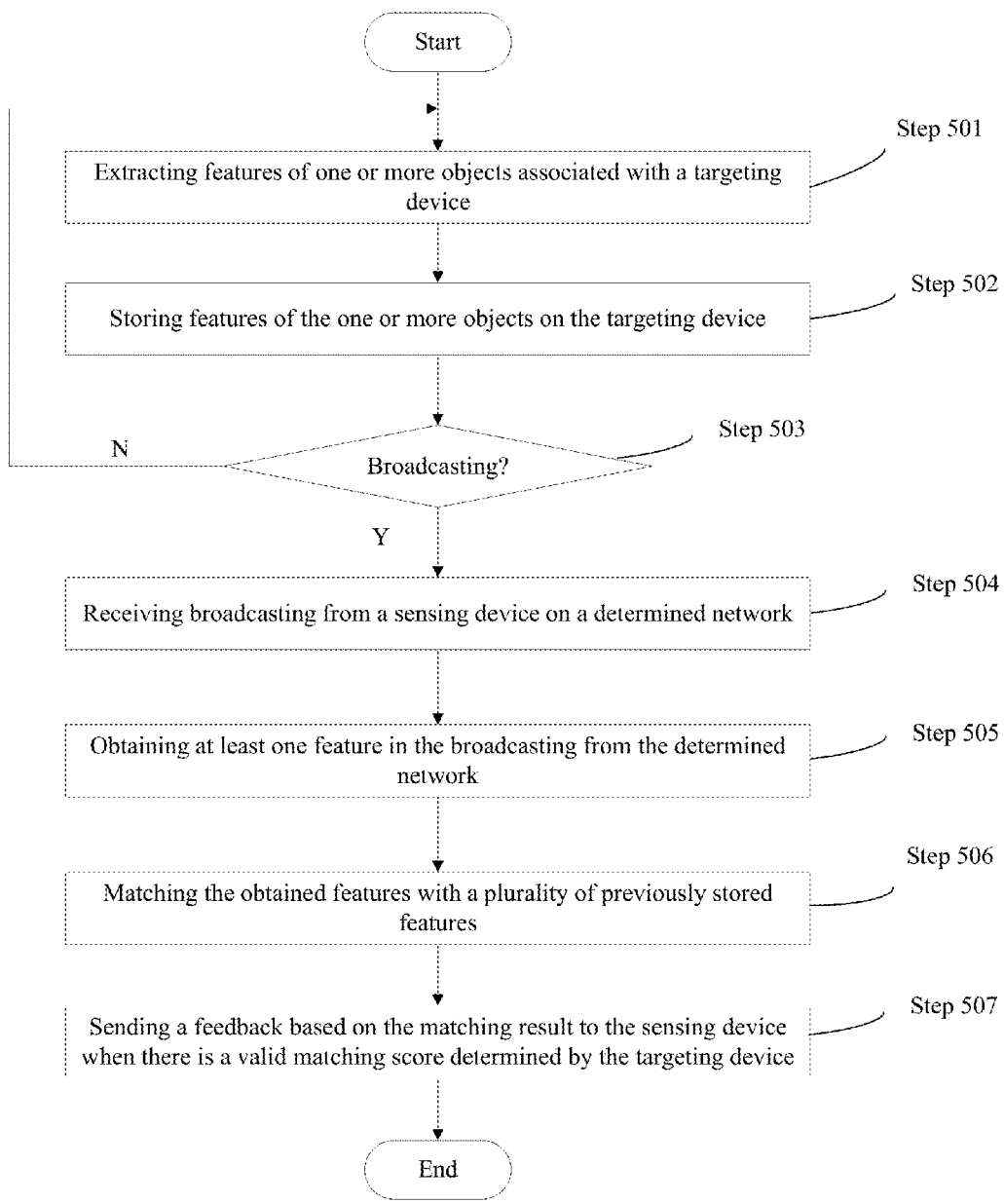
FIG. 5 shows another exemplary process for sharing information among multiple devices performed by a targeting device consistent with the disclosed embodiments.

FIG. 5 shows another exemplary process for sharing information among multiple devices performed by a targeting device consistent with the disclosed embodiments. As shown in FIG. 5, from a targeting device side, the process for sharing information among multiple devices may include the following steps.

The targeting device extracts features of one or more objects associated with the targeting device (Step 501). An object may refer to an image, a video frame, an audio segment, a sensor reading, or a subject or portion thereof. As data or received signals for the targeting device may be continuous, the targeting device may continuously extract the features when new data or signals are received. Then, the targeting device stores the extracted features of the one or more objects on the targeting device (Step 502). The number of extracted features to be stored may be determined based on a total amount of storage space on the targeting device, or may be configured by the user.

Further, the targeting device may listen to a broadcasting channel over a network connecting the targeting device. The targeting device detects whether there is broadcasting from the sensing device in the network (Step 503). If the targeting device does not detect the broadcasting from the sensing device in the network, the process goes back to Step 501. If the targeting device detects the broadcasting from the sensing device in the network, the targeting device receives the broadcasting from the sensing device on a determined network (Step 504).

The targeting device obtains at least one feature in the broadcasting from the determined network (Step 505). After obtains the feature or features in the broadcasting from the sensing device, the targeting device matches the obtained feature with a plurality of previously stored features (Step 506).

Specifically, after the targeting device receives the features broadcasted from the sensing device, the targeting device uses a predetermined matching algorithm to match the received features with the stored features. The predetermined matching algorithm may be associated with a particular type of feature, and may be used by any targeting device to perform the matching. Further, the targeting device generates a matching score to represent possibility of the received features as copies of features associated with the targeting device's signals by matching the received features with the plurality of features previously stored in a data storage module. Then, the matching score is compared to a pre-assigned threshold. The pre-assigned threshold may be set by a user. If the matching score is not smaller than the pre-assigned threshold, the matching score is returned to the sensing device via a response channel.

On the other hand, if the matching score is below the threshold, the targeting device may determine not to respond to the broadcasting, or may respond to the broadcasting with a negative response. If the targeting device does not have the matching capability for the type of the feature, the targeting device may determine not to respond or may respond to the broadcasting with the negative response. If no type of feature is determined, the targeting device may use a default matching algorithm to perform the matching.

When there is a valid matching score determined by the targeting device (i.e., the matching score is above the threshold), the targeting device sends a feedback based on the matching result to the sensing device (Step 507).

After the sensing device recognize the targeting device based on the feedback, the sensing device and the targeting device start sharing information. That is, the targeting device synchronizes with the sensing device and shares information with the sensing device. Thus, the above process enables the users to seamlessly share information across the devices in real time. That is, the process can automatically connect and synchronize two devices for sharing information with a user friendly manner.

In one embodiment, when a user has a wearable device, such as a bracelet, a smartwatch or a mobile phone, the wearable device may be wirelessly connected to TV 102. That is, the wearable device may be used as a sensing device to communicate to TV 102 (i.e., targeting device). To be specific, the mobile phone's camera is used as a visual sensor, although the mobile phone has multiple sensing capabilities that can fit into the process for sharing information. When a user is watching a TV program, he/she points his/her mobile phone's camera to the TV, which is a "Sense" step to let the mobile phone sense the object (that is, the TV with pictures showing on the screen); then the mobile phone communicates with all home devices connected in the network with a collaborative process to identify which device it sensed, that is, a "Recognize" step. It should be noted that the "Recognize" step can fail if the mobile phone's camera does not point to a real device, as no device can help the mobile phone to identify the targeting object. Once the targeting device is determined, the mobile phone is synchronized with the recognized targeting device to obtain all the sharing information from the recognized targeting device. That is, in an "Synchronization" step, the sensing device may receive information from the recognized targeting device and update the information in real time. Thus, the process for sharing information can cover a wider scope with all home devices. The system integrates signal storage, signal abstraction, signal broadcasting, signal matching, and data synchronization into a unified process flow to enable the user to seamlessly share information across the devices in real time.

Figure 6:
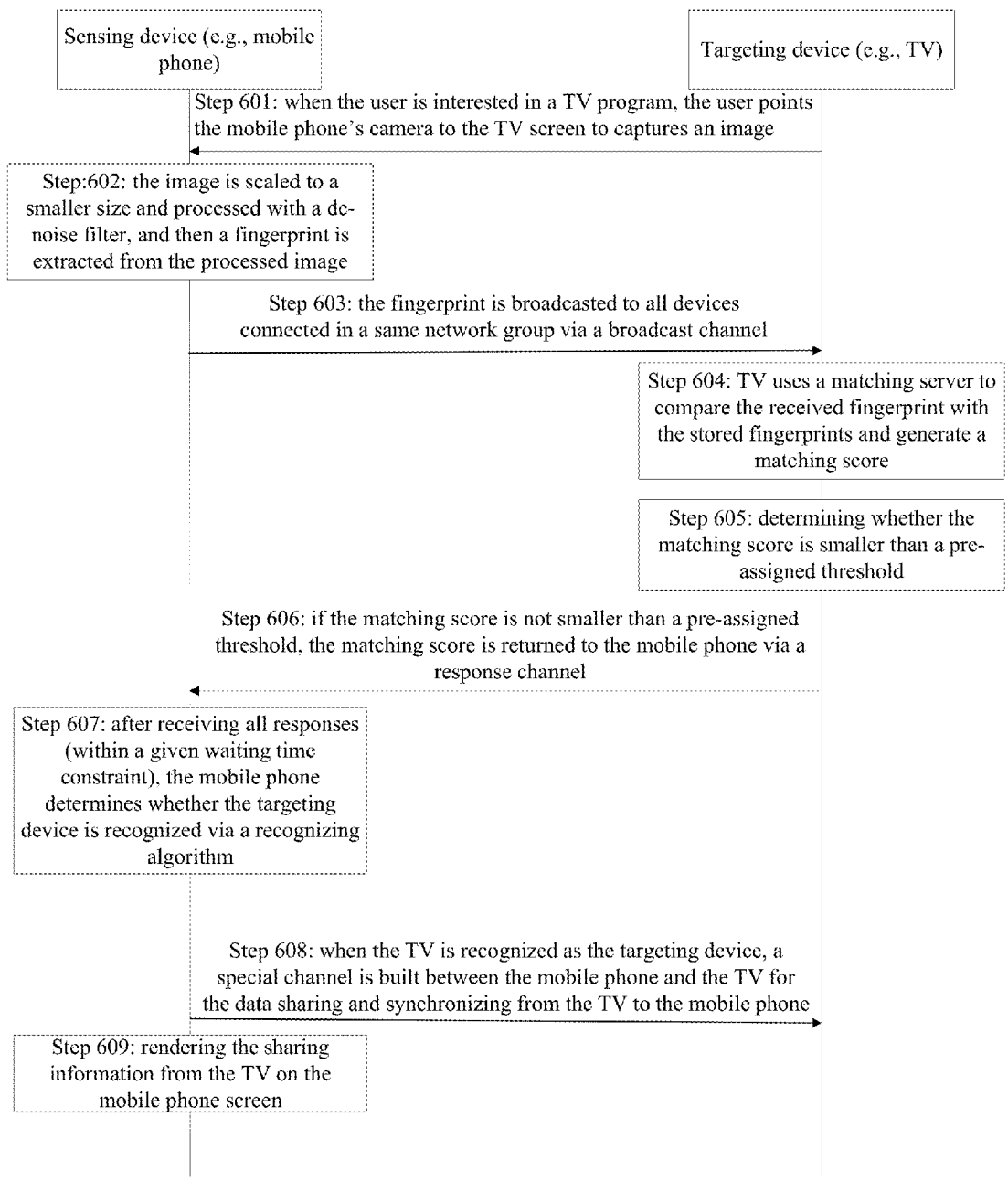
FIG. 6 shows an exemplary process for sharing image data among multiple devices using a mobile phone consistent with the disclosed embodiments.

FIG. 6 shows an exemplary process for sharing image data among multiple devices using a mobile phone consistent with the disclosed embodiments. As shown in FIG. 6, a mobile phone is used by a user as a sensing device, and a TV is used as a targeting device.

It is assumed that a user watches a TV show on the TV while the user uses the mobile phone to share information with the TV automatically. The TV constantly stores fingerprints a certain number of video frames of the currently displayed TV show on the TV with a queue because the video is essentially a sequence of frames and the changes between the consecutive frames are relatively small. For example, the TV may store 30 fingerprints for the past 10 second video with a 3 frames/second sampling rate.

When the user is interested in a specific TV program, the user points the mobile phone's camera to the TV screen to captures an image (Step 601). In Step 601, the mobile phone is used to sense an object (e.g., an image displayed on the TV screen).

The image is scaled to a smaller size and processed with a de-noise filter, and then a fingerprint is extracted from the processed image (Step 602). A fingerprint generation algorithm is used for each captured image. For example, a Pyramid of Histograms of Orientation Gradients (PHOG) descriptor may be used to generate the fingerprint for each captured image, in which both shape and appearance features are included. The PHOG is a rotation invariant descriptor. Other fingerprint generation algorithm may also be used to generate a fingerprint for each captured image.

The extracted fingerprint is broadcasted to all devices connected in the same network group via a broadcast channel (Step 603). When the TV receives at least one message via the corresponding broadcast receiver, the TV may determine whether a fingerprint(s) is received and may compare or use a matching server to compare the received fingerprint with the stored fingerprints and generate a matching score (Step 604). The kernel of PHOG similarity may be used to calculate the matching score.

Further, the matching score is compared to a pre-assigned threshold (Step 605). If the matching score is smaller than the pre-assigned threshold (it means that there is no response to the mobile phone), the process goes to Step 601; otherwise, the matching score is returned to the mobile phone via a response channel (Step 606).

After receiving all responses (within a given waiting time constraint), the mobile phone determines whether the targeting device (i.e., the TV) is recognized via a recognizing algorithm (Step 607). The outcome of device recognition is evaluated by Formula 1 described above. If no targeting device is recognized, the process goes to Step 601 with a returned failure; otherwise, a specific channel is built between the sensing device (i.e., the mobile phone) and the targeting device (i.e., the TV) for sharing and synchronizing the data from the TV to the mobile phone (Step 608).

Finally, the mobile phone renders the sharing information from the TV on the mobile phone screen (Step 609). For example, the mobile phone may display the title of the currently displayed video program on the TV, the schedule of the video program, and/or an interface for change the program displayed on the TV for the user, etc.

It should be noted that the sensing device can also be other devices (e.g., a tablet, a smartwatch) that have sensing capabilities, and the targeting device can be also a non-TV device (e.g., an audio player). As long as a relationship between a sensing device and a targeting device can be created, the information can be shared among multiple devices. The sensed object may include e-books, videos, music, webpages, and so on.

Figure 7:
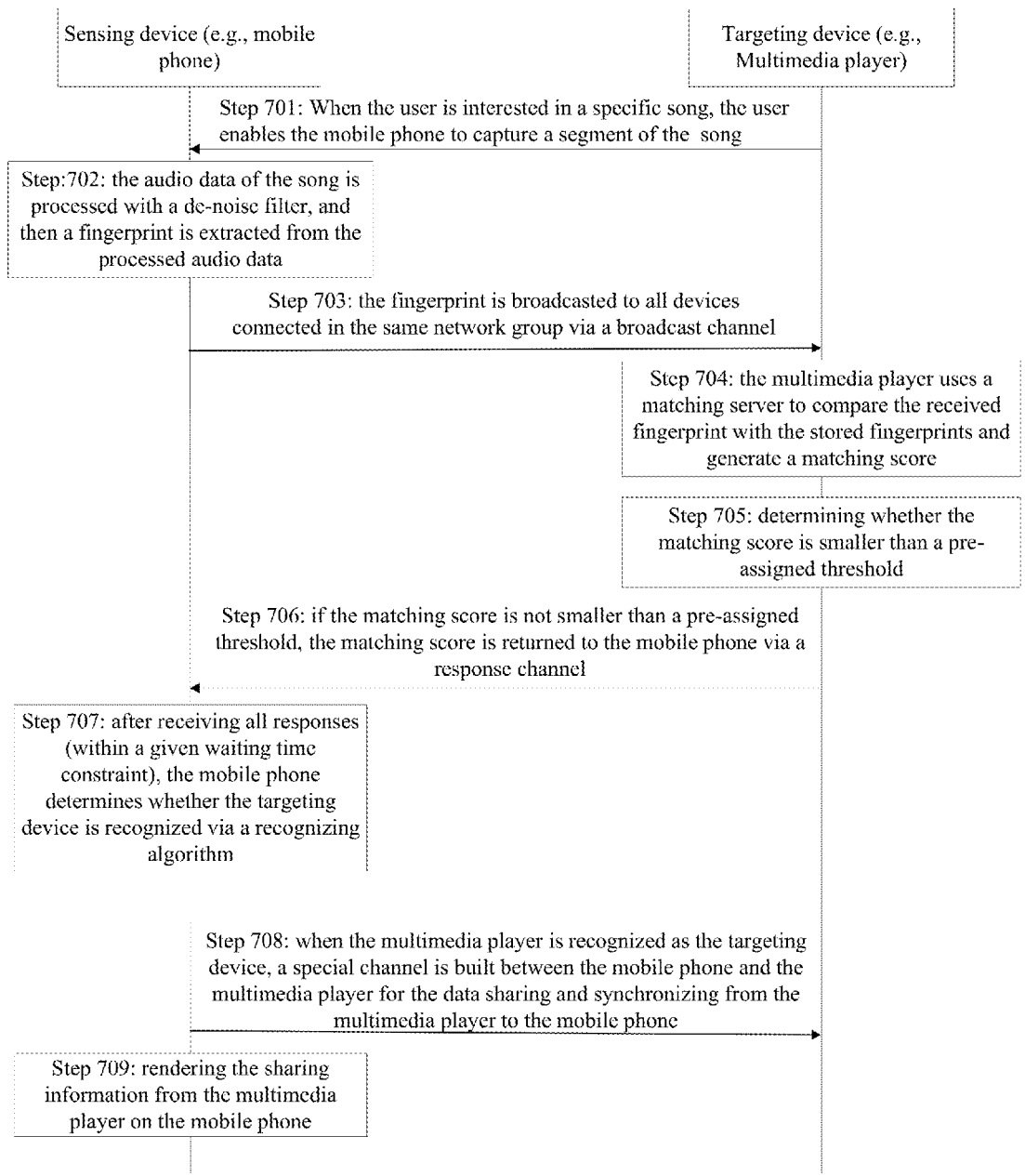
FIG. 7 shows an exemplary process for sharing audio data among multiple devices consistent with the disclosed embodiments.

For another example, a user listens to songs played by a multimedia player. FIG. 7 shows an exemplary process for sharing audio data among multiple devices consistent with the disclosed embodiments. As shown in FIG. 7, when a user is interested in a specific song, the user enables the mobile phone to capture a segment of the played song by activating a record button (Step 701). In Step 701, the mobile phone is used to sense an object or signals (that is, the song played by the multimedia player). That is, the mobile phone's microphone captures audio data of the song.

The audio data of the song is processed with a de-noise filter, and then a fingerprint is extracted from the processed audio data (Step 702). For a song, a fingerprint is much smaller in size than the song itself (e.g., 0.5-1%). An audio fingerprint is a content based compact signature, which summarizes audio signals. That is, acoustic characteristics of the audio signals may be extracted and stored as a fingerprint. A fingerprint generation algorithm is used for the captured audio data.

The extracted fingerprint is broadcasted to all devices connected in the same network group via a broadcast channel (Step 703). When the multimedia player receives at least one message via the corresponding broadcast receiver, the multimedia player may compare or use a matching server to compare the received fingerprint with the stored fingerprints and generate a matching score (Step 704).

Further, the matching score is compared to a pre-assigned threshold (Step 705). If the matching score is smaller than the pre-assigned threshold, the multimedia play decides not to respond, i.e., there is no response to the mobile phone. Thus, the process goes back to Step 701; otherwise, the matching score is returned to the mobile phone via a response channel (Step 706).

After receiving all responses (within a given waiting time constraint), the mobile phone determines whether the targeting device (i.e., the multimedia player) is recognized via a recognizing algorithm (Step 707). The outcome of device recognition may be evaluated by Formula 1 described previously. If no targeting device is recognized, the process goes to Step 701 with a returned failure; otherwise, a special channel is built between the sensing device (i.e., the mobile phone) and the targeting device (i.e., the multimedia player) for sharing and synchronizing the data from the multimedia player to the mobile phone (Step 708). Finally, the mobile phone renders the sharing information from the multimedia player on the mobile phone (Step 709). For example, the mobile phone may display title of the song, singer of the song, date of release, and/or an interface for controlling playing of the song on the multimedia player, etc.

For another example, when a user is interested in an e-book displayed on a computer, the user captures an e-book page (for example, an e-book cover) displayed on the computer by using a tablet's camera. The image of the e-book page is processed with a de-noise filter, and then a fingerprint is extracted from the processed image data by the tablet. The extracted fingerprint is broadcasted to all devices connected in the same network group via a broadcast channel. The tablet receives feedbacks from a plurality of devices on the network in response to the broadcasting and automatically identifies the targeting device (i.e., the computer) based on the received feedbacks. The e-book is synchronized and shared between the tablet and the computer.

It is understood that the disclosed systems and methods are also not limited to home usage scenario. The disclosed methods may fit into any networked device group in the network. The involved devices may use the capabilities they have. For example, the devices can use the visual sensing capability to capture images; the devices can use the audial sensing capability to capture audio signals. A device without signal matching capability cannot respond to the broadcasting of the sensing device, thus the device's information cannot be shared by others. However, the device does not disable its capability to get shared information from others as long as it has sensing, broadcasting and information receiving capability.

By using the disclosed methods and systems, a sense-recognize-sync (SRS) model for the multi-device interaction may be implemented to significantly improve user experiences, which enables the users to seamlessly share information across the devices in real time. For example, when a user is watching a TV program, he/she point his/her mobile phone's camera to the TV, which is the "sense" step to let the phone sense the object, which is the TV with picture showing on screen; then the phone communicate with all home devices connected in the network with a collaborative process to identify which device it sensed, that is the "recognize" step. Once the targeting device is determined, the mobile phone is synchronized with the targeting device to obtain all the sharing information from the targeting device.

Further, such the SRS model is not limited to home usage scenario, as it fit into any networked device group in the network. The involve devices may use the capability they have, for example, if they can capture image then use the visual sensing capability, if they can capture audio signals then use the audial sensing capability. A device without signal matching capability may be unable to respond to the broadcasting of the sensing device, thus its information cannot be shared by others using this model. However, it does not disable its capability to get shared information from others as long as it has sensing, broadcasting and information receiving capability.

Further, although the method is disclosed for illustrative purposes, similar concept and approach can be applied to all scenarios that have multiple connected devices involved. The signals can be visual signals, acoustic signals or other kinds of signals, as long as the devices can be classified into the sensing device and the targeting device. The information for sharing among multiple devices can also be changed according to the implementation of the devices. Other applications, advantages, alternations, modifications, or equivalents to the disclosed embodiments are obvious to those skilled in the art.

What is claimed is:

1. A method for sharing information among multiple devices, comprising:
   sensing, by a sensing device, real-time signals of at least one object associated with a targeting device, wherein the at least one object includes real-time media content played back by the target device;
   extracting, by the sensing device, at least one feature of the object from the sensed signals;
   extracting, by the targeting device, at least one feature of the at least one object associated with the targeting device;
   broadcasting, by the sensing device, the extracted feature of the object on a determined network containing a plurality of targeting devices;
   receiving, by the sensing device, feedbacks from the plurality of targeting devices on the network in response to the broadcasting;
   based on the received feedbacks, automatically identifying, by the sensing device, one of the plurality of targeting devices, comprising:
      obtaining corresponding matching scores from the received feedbacks from the plurality of targeting devices;
      determining an identification outcome for each one of the plurality of targeting devices based on the matching scores; and
      identifying the one targeting device based on the identification outcome, wherein the identification outcome is defined by: $H=a*S+(1-a)*f$, H is the identification outcome, a is a real number between [0, 1], S is a matching score received from a targeting device, and f is a frequency of the targeting device being identified previously;
   synchronizing, by the sensing device, information with the identified targeting device; and
   displaying, by the sensing device, the synchronized information to a user of the sensing device, wherein the synchronized information includes the real-time media content played back by the target device.

2. The method according to claim 1, wherein sensing signals of at least one object associated with a targeting device further includes:
   detecting one or more surrounding signals by the sensing device; and
   filtering out noise and unwanted content from the detected signals to generate a plurality of sensed signals.

3. The method according to claim 1, wherein extracting at least one feature of the object from the sensed signals further includes:
   generating a fingerprint for the sensed signals to represent the sensed signals in a significantly smaller size than that of the sensed signals.

4. The method according to claim 1, wherein the one targeting device is configured for:
   storing the extracted features of the one or more objects;
   detecting whether there is broadcasting from the sensing device on the determined network;
   when it is detected the broadcasting from the sensing device on the determined network, receiving the broadcasting from the sensing device on the determined network;
   obtaining at least one feature in the broadcasting from the determined network;
   matching the obtained feature with the stored extracted features; and
   sending a feedback based on a matching result to the sensing device.

5. The method according to claim 4, wherein matching the obtained features with the previously stored features further includes:
   receiving the features broadcasted from the sensing device;
   generating a matching score between the received feature and any of the stored extracted features;
   comparing the matching score with a pre-determined threshold; and
   when the matching score is not smaller than the pre-determined threshold, returning the matching score as the matching result to the sensing device via a response channel.

6. The method according to claim 4, further including:
establishing a real-time channel between the sensing device and the one targeting device for sharing and synchronizing information in real-time from the one targeting device to the sensing device.

7. A system for sharing information among multiple devices, comprising:
a sensing device configured to seek information from other devices, comprising:
a sensing and filtering module configured to detect real-time signals of at least one object associated with a targeting device and filter out noises and unwanted content from the detected signals to generate a corresponding plurality of sensed signals, wherein the at least one object includes real-time media content played back by the target device;
a signal abstraction module configured to extract at least one feature of the object from the sensed signals;
a broadcast engine configured to broadcast the extracted feature of the object on a determined network containing a plurality of targeting devices;
a response receiver configured to receive feedbacks from the plurality of targeting devices on the network in response to the broadcasting;
a device recognizer configured to automatically identify one of the plurality of targeting devices based on the received feedbacks, the device recognizer is further configured to:
obtain corresponding matching scores from the received feedbacks from the plurality of targeting devices;
determine an identification outcome for each one of the plurality of targeting devices based on the matching scores; and
identify the one targeting device based on the identification outcome, wherein the identification outcome is defined by: $H=a*S+(1-a)*f$, H is the identification outcome, a is a real number between [0, 1], S is a matching score received from a targeting device, and f is a frequency of the targeting device being identified previously; and
an information synchronizer configured to synchronize information with the identified targeting device, wherein the synchronized information includes the real-time media content played back by the target device; and
at least one targeting device configured to share the information to the sensing device, comprising:
a signal receiver configured to receive signals and handle the signal processing for rendering contents and other functions;
a signal abstraction module configured to extract at least one feature of the at least one object associated with the targeting device from the received signals;
a data storage module configured to store the extracted features;
a broadcast receiver configured to receive the features broadcasted from the sensing device; and
a match engine configured to match the received feature with the extracted features previously stored in the data storage module.

8. The system according to claim 7, wherein the signal abstraction module is further configured to:
generate a fingerprint for the sensed signals to represent the sensed signals in a significantly smaller size than that of the sensed signals.

9. The system according to claim 7, wherein the match engine is also configured to:
generate a matching score between the obtained feature and any of the stored extracted features;
compare the matching score with a pre-determined threshold; and
when the matching score is not smaller than the pre-determined threshold, return the matching score as the matching result to the sensing device via a response channel.

10. The system according to claim 7, wherein the information synchronizer is further configured to:
establishing a real-time channel between the sensing device and the one targeting device for sharing and synchronizing information in real-time from the one targeting device to the sensing device.

11. The method according to claim 1, wherein the sensing device is able to sense at least video signals, audio signals, optical signals, electrical signals, magnetic signals, radio signals, and ultrasonic signals in real time.

12. The system according to claim 7, wherein the sensing device is able to sense at least video signals, audio signals, optical signals, electrical signals, magnetic signals, radio signals, and ultrasonic signals in real time.

13. The method according to claim 1, wherein the sensing device is a wearable device.

14. The system according to claim 7, wherein the sensing device is a wearable device.

* * * * *